(12) United States Patent
Hough

(10) Patent No.: US 10,179,746 B2
(45) Date of Patent: Jan. 15, 2019

(54) METHOD AND APPARATUS FOR THE TREATMENT OF WASTE

(71) Applicant: WH Systems, Cincinnati, OH (US)

(72) Inventor: Richard Murray Hough, Lansing, MI (US)

( * ) Notice: Subject to any disclaimer, the term of this patent is extended or adjusted under 35 U.S.C. 154(b) by 0 days.

(21) Appl. No.: 15/057,782

(22) Filed: Mar. 1, 2016

(65) Prior Publication Data

US 2017/0253517 A1   Sep. 7, 2017

(51) Int. Cl.
| | | |
|---|---|---|
| *C02F 11/00* | (2006.01) | |
| *C02F 11/12* | (2006.01) | |
| *C02F 11/18* | (2006.01) | |
| *C02F 101/32* | (2006.01) | |
| *C02F 101/34* | (2006.01) | |

(52) U.S. Cl.
CPC .............. *C02F 11/18* (2013.01); *C02F 11/12* (2013.01); *C02F 2101/322* (2013.01); *C02F 2101/34* (2013.01); *C02F 2101/40* (2013.01); *C02F 2303/06* (2013.01)

(58) Field of Classification Search
CPC .......... B09C 1/06; C02F 11/004; C02F 11/12; C02F 11/14; C02F 11/18; C02F 11/125; C02F 11/126; F26B 17/18; F26B 17/20; F26B 17/205; F26B 3/18; F26B 3/20; F26B 7/002; B09B 3/0083; B01F 2005/0633; B01F 7/00158
See application file for complete search history.

(56) References Cited

U.S. PATENT DOCUMENTS

| | | | | |
|---|---|---|---|---|
| 5,188,041 A | * | 2/1993 | Noland | B01D 53/1456 110/226 |
| 5,216,821 A | * | 6/1993 | McCabe | B01J 19/20 34/180 |
| 5,342,124 A | * | 8/1994 | Swisher, Jr. | B01F 7/00158 366/173.2 |
| 5,697,168 A | * | 12/1997 | Matthys | F26B 17/20 110/224 |
| 7,669,349 B1 | * | 3/2010 | Palmer | F26B 11/16 210/770 |
| 2003/0035341 A1 | * | 2/2003 | Blakley | B01F 7/001 366/330.2 |
| 2005/0145418 A1 | * | 7/2005 | Cordova | B01D 3/38 175/66 |
| 2010/0028089 A1 | * | 2/2010 | Burke | C12P 7/10 406/53 |
| 2011/0255364 A1 | * | 10/2011 | Kato | B01F 3/18 366/157.1 |
| 2014/0061106 A1 | * | 3/2014 | Knoop | C02F 3/28 210/96.1 |

FOREIGN PATENT DOCUMENTS

WO   WO2015039174   *   3/2015

* cited by examiner

*Primary Examiner* — Pranav N Patel
(74) *Attorney, Agent, or Firm* — Parker D. McCrary

(57) ABSTRACT

Disclosed are methods and machines for removing volatile compounds from sludge. Additionally, disclosed are methods and machines for removing pathogens from sludge.

11 Claims, 6 Drawing Sheets

METHOD AND APPARATUS FOR THE TREATMENT OF WASTE

FIELD

The subject matter disclosed herein generally relates to machines and methods for removing volatile compounds from sludge.

BACKGROUND

Wastewater treatment is a process for turning wastewater into water than can either be disposed of by returning it to the water cycle or reused as potable water. If the wastewater is primarily from municipal sources, or sewage, the process is called sewage treatment.

Most sewage treatment facilities have at least four treatment stages. In the pretreatment stage, large objects are removed from sewage using a bar screen. Large objects include tree branches, leaves, limbs, trash, and other non-biological sources of waste.

After large objects are removed via pre-treatment, the sewage will be subjected to primary treatment. In this stage, the sewage is temporarily held in pre-settling basins where heavy solids can settle to the bottom while lighter materials can float to the surface. The floating materials are removed and the level of liquid is regulated, discharging when needed due to rain.

Secondary treatment uses microorganisms to degrade the chemical and biological components of the sewage, including human waste, food waste, soaps, and detergents. Microorganisms, such as bacteria and protozoa will consume and break down much of the chemical and biological components dissolved or suspended in sewage. After secondary treatment, at least two materials are still left: water and sludge.

A fourth stage in sewage treatment is to treat the remaining water and sludge. After the biological secondary treatment, sludge separates from water by gravity. The remaining water can then be further purified, depending on its ultimate use. The wastewater can be treated to remove phosphorus, nitrogen and other nutrients, or disinfected with chlorine, ozone or ultraviolet.

Sludge can be composed of water and a variety of accumulated solids from the previous treatment stages. While the treated water has a clear destination, either a return to the water cycle or into the drinking water supply, there are fewer options for the sludge. Moreover, the sludge also traps large quantities of water. The water remaining in sludge can be hard to remove and reusing it can be energy intensive compared with using the water that easily separates from the sludge using gravity as described above in previous treatment stages.

Sludge can either be recycled or disposed in landfills. Two strategies can be employed to process the solid components in sludge for recycling: (1) energy recovery through generation of methane or (2) use as fertilizer. First, some energy can be recovered through anaerobic digestion of sludge, which produces methane. Methane can then be burned to partially recover the energy cost of processing sludge. Another possible destination for sludge is to be used as a fertilizer. However, for sludge to be used for energy recovery or as fertilizer, the sludge must either be transported offsite for processing and/or dried for adequate use. Sludge that is not processed ends up in landfills, but is generally dried prior to placement to lower refuse costs. When transporting sludge, the more water, the less concentrated the sludge, which leads to higher transportation costs. The sludge can be concentrated through centrifugation or conventional drying.

EPA 503 governs the use or disposal of sludge EPA has put forth a comprehensive set of rules and guidelines for the handling of these sewage solids and the need to render it free from pathogens prior to disposal or use. As a result, communities are reluctant to accept the material as a soil additive due to the possibility for changing regulations on the disposal of waste sludge. This puts a higher burden on each plant to bring their processes into line to meet the EPA 503 guidelines. Currently, the equipment most widely used is a belt press which removes 20-30% of the liquid in the solids with the addition of additives such as lime that helps bind the solids. Using the additives adds additional costs and weight to the transportation expense but does nothing to address the reduction of the pathogen found in the sludge. As a result, the cost of transportation from the plant to the disposal site continues to rise.

SUMMARY

The present disclosure relates to machines and apparatuses for removing volatile compounds from sludge and methods for removing volatile compounds from sludge.

Through the process for removing water, the sludge will meet or exceed EPA 503 guidelines. The disclosed machine and apparatus will reduce the moisture content of sludge to as low as 8-10 wt % while removing the pathogens in the same process.

BRIEF DESCRIPTION OF THE FIGURES

The accompanying Figures, which are incorporated in and constitute a part of this specification, illustrate several aspects described below.

DETAILED DESCRIPTION

Figure 1:
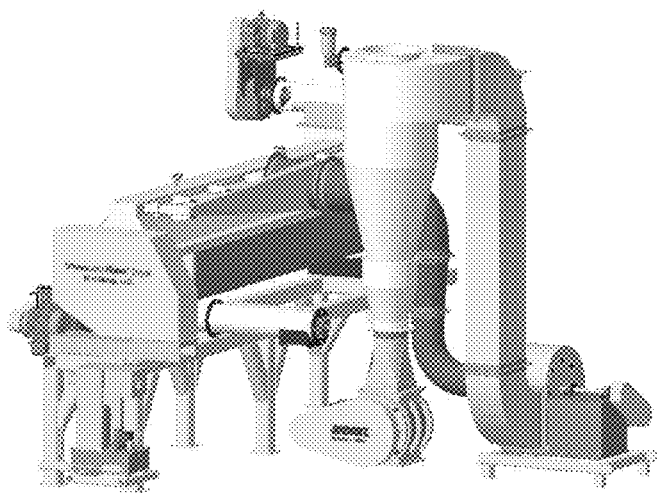
FIG. 1 displays an apparatus that can be used to remove water from sludge.

Provided herein are methods and machines for removing volatile compounds from sludge. The machines and methods disclosed here can also remove pathogens from the sludge in the same processing stage.

The materials, compounds, compositions, articles, machines, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific methods or machines, as such may, of course, vary. It is also to be understood that the terminology used herein is for the purpose of describing particular aspects only and is not intended to be limiting.

Also, throughout this specification, various publications may be referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "wt %" is understood throughout this specification to indicate the weight of volatile compounds as a percentage of the total weight of the sludge prior to processing with the disclosed machines or methods.

The term "sludge" is understood throughout this specification to indicate the resulting mixture of solids and liquids obtained after wastewater treatment processes.

Components of Apparatus

In some embodiments, the apparatus described herein can be used to remove water and/or other volatile compounds from sludge. In some embodiments, the apparatus can be used to remove water and/or other volatile compounds from biosolids. The sludge and/or biosolids can be products of the treatment of sewage or wastewater. The apparatus can be used before, incorporated at any time during the treatment of sewage, or after the water treatment processes have been completed. In some embodiments, the material is loaded after the treatment processes have been completed. In some embodiments, sludge is loaded after the treatment processes have been completed.

Figure 2:
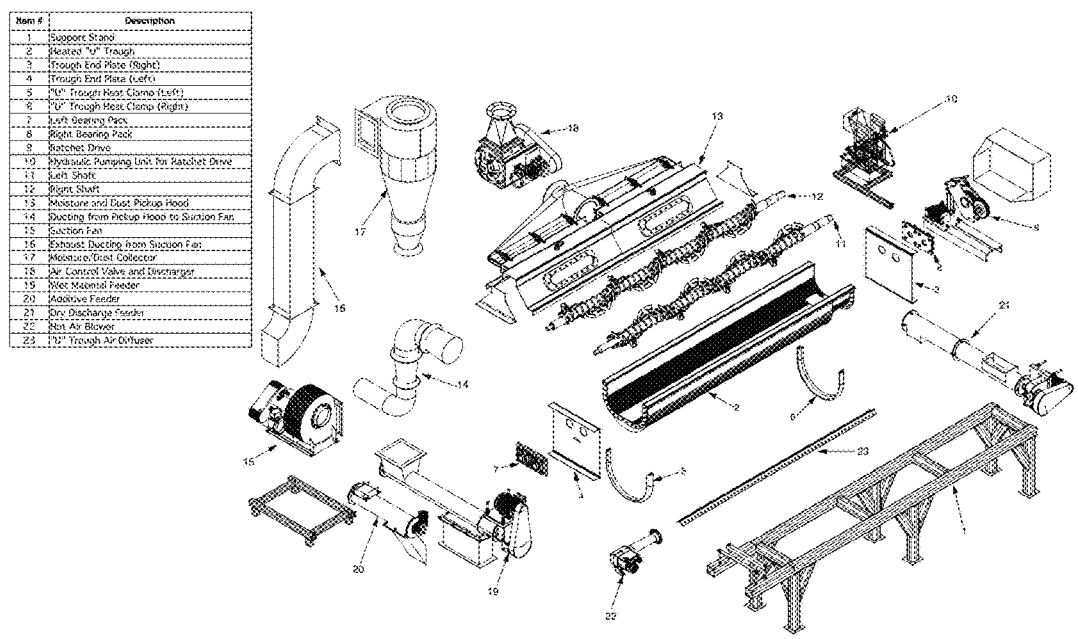
FIG. 2 displays the apparatus that can be used to remove water from sludge from FIG. 1, but the components have been separated.

The apparatus described herein to remove volatile compounds from sludge can have several components: a trough (FIG. 2, #2), rotating shafts (FIGS. 2, #11 and #12), paddles attached to the rotating shafts (FIG. 4, #11-1), a ratchet drive to rotate the shafts (FIG. 2, #9), a duct to allow heated gases to be added and for evaporated gases to leave (FIG. 2, #14), and/or a heating element (FIG. 2, #2). These components work to move the sludge through the apparatus (FIG. 1 and FIG. 2) and remove volatile compounds from the sludge.

Trough

The trough (FIG. 2, #2) can be a large container where the material resides during the drying process. The trough can be "U" shaped. The trough can also be known as a dryer. The trough can be where the drying processes take place.

The trough can be heated with a heating element to aid in the removal of volatile compounds and to counteract evaporative cooling.

Rotating Shafts

The rotating shafts (FIGS. 2, #11 and #12) can run the length of the trough of the apparatus. The shafts can rotate to move the loaded sludge, which can allow for water and other volatile compounds to escape. The shafts can rotate independently of each other. In other words, one or more shafts can rotate clockwise, while an other amounts of shafts can rotate in the counter clock-wise direction. The shafts can rotate at different or the same speed.

The shafts can be rotated with a ratchet drive. In some embodiments, a hydraulic cylinder can slowly rotate the ratchet drive, which will rotate the shaft as the ratchet wheel advances and engages an additional pawl. In some embodiments, other conventional motors can rotate the ratchet drive.

In some embodiments, paddles can be attached to the shafts. The paddles can help move the material while the material is in the trough or dryer. In some embodiments the shafts are hollow to allow for the shafts to be independently heated with an additional heating element.

Paddles

Figure 3:
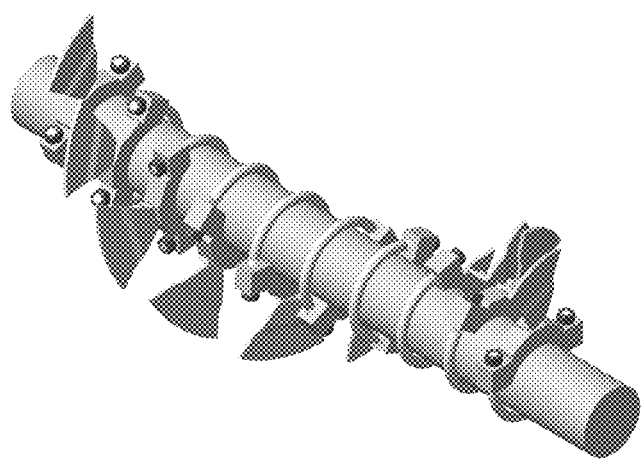
FIG. 3 displays a shaft with the attached paddles for use in the apparatus.
Figure 4:
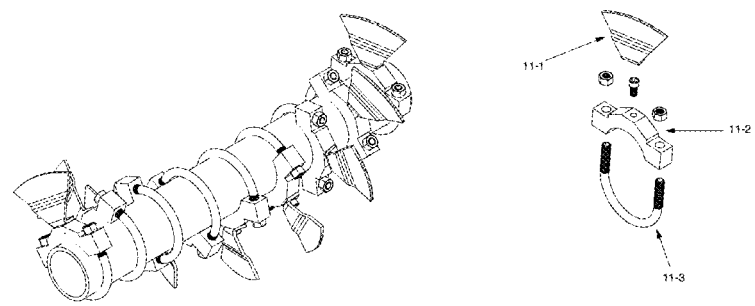
FIG. 4 displays the clamp that can be used to attach the paddle to the shaft and adjust the pitch of the paddle while attached to the shaft.

Paddles can be attached to the shaft. FIG. 3 displays an example of paddles attached to a rotating shaft. The paddles can act to move the sludge within the dryer. The paddles can be attached to the shaft using a clamp. In some embodiments the clamp can wrap entirely around the shaft. FIG. 4 displays an example of how the paddles can be attached to the rotating shafts.

The clamp can be tightened around the shaft using a nut or a bolt (FIGS. 4, #11-2 and #11-3). The paddle can be attached to the clamp using a nut, bolt, or any other device with a means to affix to devices together. The pitch of the paddles, or the angle of the paddle in relation to the shaft, can be adjusted. Altering the pitch of the paddle can allow for a higher drying efficiency by constantly changing the angle at which the paddle contacts the sludge, thereby allowing a greater amount of volatile compounds to leave the sludge.

Ratchet Drive

Figure 5:
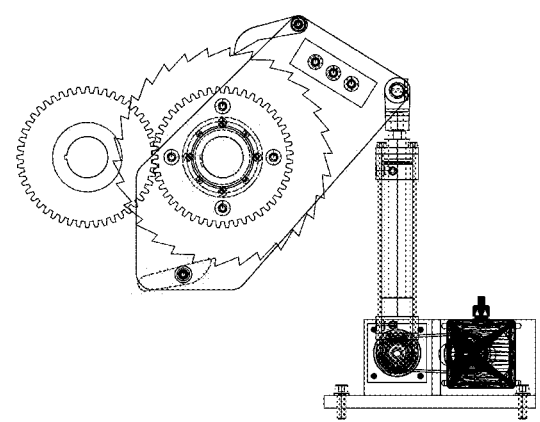
FIG. 5 displays a ratchet motor that rotates the shafts.
Figure 6:
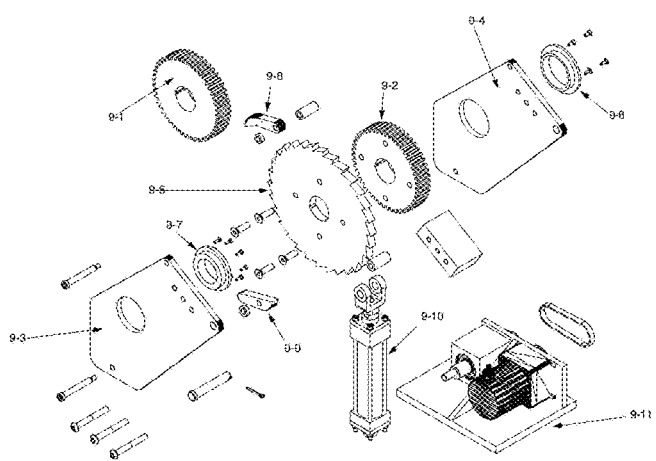
FIG. 6 displays the ratchet motor from FIG. 5, but the components have been separated.

The ratchet drive (FIG. 5 and FIG. 6) can be attached to the base of each shaft. A hydraulic cylinder stroke can push the ratchet wheel one measure per stroke of the hydraulic cylinder. The movement of the wheel one measure can rotate the shaft. The rotation of the shaft can press the sludge material, which can act to press volatile compounds to the surface of the sludge. The rotation of the shaft can also move the sludge down the length of the shaft, where the pitch of the paddles may be altered to increase or decrease the removal of water vapor. As the hydraulic cylinder starts a new stroke, the ratchet wheel can remain still, which can stop the rotation of the shaft.

Duct

In some embodiments a duct (FIG. 2, #14) can be attached to the trough. In some embodiments, the duct can allow for heated gas to be incorporated into the trough. In some embodiments, the duct can allow for the volatile compounds to leave the trough after being removed from the sludge. In some embodiments, a fan can be added to aide in the removal of volatile compounds from the trough (FIG. 2, #15). The exhaust fan can be attached to an additional duct (FIG. 2, #16) to exhaust volatile compounds from the apparatus.

In some embodiments, heated gases can be injected into the trough (In some embodiments, heated gases can be injected into the trough, which can help the volatile compounds on the surface of the sludge to be removed (FIG. 2, #22), which can help the volatile compounds on the surface of the sludge to be removed. The heated gases can be incorporated into the trough through an air diffusor (FIG. 2, #23). The air diffusor can be a long duct running along the base of the trough with openings to allow the incorporation of the heated gas.

Heating Elements

In some embodiments, a heating element (FIG. 2, #2) can be used to raise the temperature of trough during the drying process. Electrical, gas, and other heating elements can be used to heat the trough.

Volatile Compounds

In some embodiments, sludge can contain a variety of volatile compounds. In some embodiments, sludge can contain water, alkanes, oil, organic compounds, benzene, toluene, xylenes, pharmaceutically active compounds, pesticides, and/or inorganic compounds. In some embodiments, these compounds can be volatilized using the apparatus described herein.

Heated Gases

In some embodiments, heated gases can be added into the trough during the drying process. Some possible heated gases include compressed air, nitrogen, argon, carbon dioxide, steam, oxygen, ammonia, $NO_x$, and/or $SO_x$.

Method of Use of the Apparatus

In some embodiments, the apparatus can use two parallel shafts with one rotating clockwise and the other counter clockwise. Each shaft can be equipped with individual paddles that can be rotated to increase or decrease the pitch of each paddle to allow more or less time for drying. The screws/flight shafts can be housed in the "U" trough that can be heated by electric elements running the length of the trough. The screw shafts can be hollow, which allows them to be heated and controlled independently. The pitch of the paddles can be adjusted to suit the volume and dryness of the product being processed. Each paddle pitch can be set to the desired angle determining how fast the material moves through the hot "U" trough enhancing the drying process. Screw/flight shafts can rotate with a unique ratchet drive.

A hydraulic cylinder stroke pushing a ratchet drive one measure per stroke and the fixed end of the hydraulic cylinder anchor pin can be on an eccentric shaft driven by a variable speed drive. This can relax the material, which can reduce the compression allowing the material to expand and the moisture to be released. As the ratchet wheel is advanced, with the pawl engaged to the hydraulic cylinder, the paddle can force the product forward through the "U" trough. The pressure exerted on the product can press the moisture to the surface of the product. As the ratchet resets for the next stroke, hot air can be injected between the two screw flight shafts, which can aide the drying process. During the relax period, the water vapor can be removed with an exhaust fan. Odor control and solids separation can happen further down the air handling system. In some embodiments, if the drying capacity needs to be increased, the dryer "U" trough can be lengthened. The ratchet drive uses the energy of hydraulics for the process, which can require only a small horsepower motor to move the hydraulics.

Method of Use of Apparatus

Material, such as sludge, can be loaded into the holding tank. In some embodiments, the sludge can be pre-warmed using steam or heated air recycled from the drying process of sludge. The sludge can then be fed into the trough. Once in the trough, the paddles contact the sludge material, wherein the paddles are attached to the rotating shafts.

In some embodiments, the sludge can then be moved toward the dryer discharge through the movement of the paddles. The paddles can be organized such that the paddles rotate the material more slowly as the material moves away from the inlet, but will increase the movement of the material as it approaches the outlet of the dryer. In some embodiments, the paddles can be set to a variable pitch so the dryer can be optimized for particular conditions. Optionally, metal balls can be added into the dryer to prevent buildup on the shafts and paddles. These metal balls can be removed at the discharge with a rotary screen system.

In some embodiments, the ratchet drive rotation system can be paired with a hot air injection system as described above. The rotating shafts can press the sludge material to bring the water vapor to the surface of the sludge. The hot air can then be injected which can remove the volatile compounds trapped in the sludge.

In some embodiments, the trough is heated using at least one heating element while the sludge travels through the trough of the dryer.

After the sludge makes it way through the dryer, the finished product will leave the dryer.

Finished Product

The rotating shafts combined with the heated gas and heating elements can help to dry the sludge. The heating elements will also help to remove any pathogens remaining in the sludge. The dried granulated sludge can be inert and free of pathogens with a moisture content as low as between 8 and 10 wt %. The volume can be reduced by up to about 90% from the initial input. After drying, the sludge can be safely and efficiently bagged and used for soil enrichment or trucked to a disposal site.

What is claimed is:

1. An apparatus for removing volatile compounds from sludge comprising:
   a first shaft rotating clockwise;
   a second shaft rotating counterclockwise,
   a multitude of paddles attached to the first and second shafts,
      wherein the multitude of paddles are attached to the first and second shaft with a clamp, the multitude of paddles have an adjustable pitch, and the clamps and the multitude of paddles are rotationally offset along the first and second shafts, such that the clamps and multitude of paddles spiral around the first and second shafts at least twice with 9 or 10 paddles in a single rotation around the first and second shafts;
   a first duct,
      wherein the first duct is attached to a suction fan;
   a second duct attached to a base of the apparatus,
      wherein the second duct comprises a series of openings to allow the addition of a gas or the escape of a heated gas;
   a first heating element;
   a U-shaped heated trough;
   a hot air blower;

a variable speed drive for rotating the first shaft and the second shaft, and a moisture and dust collector connected to the suction fan.

2. The apparatus of claim 1, wherein the first and second shafts are independently rotated with a ratchet drive.

3. The apparatus of claim 2, wherein the ratchet drive is rotated with a hydraulic cylinder.

4. The apparatus of claim 3, wherein the shafts are hollow.

5. The apparatus of claim 4, wherein the shafts further comprises a second heating element.

6. The apparatus of claim 2, wherein the duct further comprises an exhaust fan to remove volatile compounds as they are removed from the sludge.

7. The apparatus of claim 2, wherein the first heating element is an electric heating element.

8. A method for removing volatile compounds comprising:
   loading sludge into the apparatus of claim 1;
   mixing the sludge with the first and second shafts;
   heating the sludge with the first heating element;
   removing any volatile compounds using the first duct.

9. The method of claim 8, wherein the first and second shafts are independently rotated with a ratchet drive.

10. The method of claim 9, wherein the ratchet drive is rotated with a hydraulic cylinder.

11. The method of claim 10, wherein the first and second shafts are hollow.

* * * * *